United States Patent
Diorio et al.

(10) Patent No.: US 11,062,190 B1
(45) Date of Patent: *Jul. 13, 2021

(54) RFID TAGS WITH PUBLIC AND PRIVATE INVENTORY STATES

(71) Applicant: Impinj, Inc., Seattle, WA (US)

(72) Inventors: Christopher J. Diorio, Shoreline, WA (US); Joel Peshkin, San Juan Capistrano, CA (US)

(73) Assignee: Impinj, Inc., Seattle, WA (US)

( * ) Notice: Subject to any disclaimer, the term of this patent is extended or adjusted under 35 U.S.C. 154(b) by 137 days.

This patent is subject to a terminal disclaimer.

(21) Appl. No.: 16/556,587

(22) Filed: Aug. 30, 2019

Related U.S. Application Data

(63) Continuation of application No. 16/056,382, filed on Aug. 6, 2018, now Pat. No. 10,402,710, which is a continuation-in-part of application No. 15/690,597, filed on Aug. 30, 2017, now Pat. No. 10,049,317, which is a continuation of application No. 13/854,580, filed on Apr. 1, 2013, now abandoned, which is a continuation of application No. 12/697,895, filed on Feb. 1, 2010, now abandoned.

(60) Provisional application No. 61/149,654, filed on Feb. 3, 2009.

(51) Int. Cl.
*G06K 19/07* (2006.01)
(52) U.S. Cl.
CPC ................. *G06K 19/0723* (2013.01)
(58) Field of Classification Search
CPC .................................................. G06K 19/0723
See application file for complete search history.

(56) References Cited

U.S. PATENT DOCUMENTS

| | | | |
|---|---|---|---|
| 5,673,037 A | 9/1997 | Cesar et al. | |
| 5,841,770 A * | 11/1998 | Snodgrass | H04L 29/12254 370/346 |
| 6,812,852 B1 * | 11/2004 | Cesar | G05B 19/0421 340/4.3 |
| 6,992,567 B2 | 1/2006 | Cole et al. | |
| 7,053,754 B2 | 5/2006 | Mani | |
| 7,088,246 B2 | 8/2006 | Fukuoka | |
| 2004/0046642 A1 | 3/2004 | Becker et al. | |
| 2004/0066281 A1 * | 4/2004 | Hughes | G06K 7/10029 340/10.2 |
| 2005/0057341 A1 | 3/2005 | Roesner | |
| 2005/0253687 A1 | 11/2005 | Martinez et al. | |
| 2005/0263591 A1 | 12/2005 | Smith | |

(Continued)

*Primary Examiner* — Nay Tun
(74) *Attorney, Agent, or Firm* — Hertzberg, Turk & Associates, LLC

(57) ABSTRACT

RFID tags capable of transitioning between a private state and one or more public states are provided. In the private state, tags may participate in an inventory round without restriction. In a public state, tags may be prevented from participating in an inventory round, allowed to participate without providing actual identifying information, or allowed to participate providing an alternate identifier. Whether and how the tag responds in a public state may depend on certain conditions including if one or more of the tag's flags are asserted or deasserted. A reader may select a public tag for inventorying by verifying itself, and the tag then asserting or deasserting one or more of its flags accordingly. The asserted or deasserted flag(s) may be used to determine whether and how a tag in a public state participates in an inventory round.

20 Claims, 14 Drawing Sheets

(56) References Cited

U.S. PATENT DOCUMENTS

| | | |
|---|---|---|
| 2006/0145817 A1 | 7/2006 | Aikawa et al. |
| 2006/0187031 A1 | 8/2006 | Moretti et al. |
| 2007/0046432 A1 | 3/2007 | Aiouaz et al. |
| 2007/0069863 A1 | 3/2007 | Akiyama et al. |
| 2007/0176751 A1 | 8/2007 | Cesar et al. |
| 2008/0018431 A1 | 1/2008 | Turner et al. |
| 2008/0129447 A1 | 6/2008 | Choi et al. |
| 2008/0180221 A1* | 7/2008 | Tuttle .................. G06K 19/0723 340/10.2 |
| 2008/0212360 A1 | 9/2008 | Rizzo et al. |
| 2009/0315685 A1 | 12/2009 | Bauchot et al. |
| 2010/0148933 A1 | 6/2010 | Dacus |

* cited by examiner

SIGNAL PATH DURING R→T

SIGNAL PATH DURING T→R

RFID TAGS WITH PUBLIC AND PRIVATE INVENTORY STATES

CROSS REFERENCE TO RELATED APPLICATIONS

This application is a continuation of U.S. patent application Ser. No. 16/056,382, filed on Aug. 6, 2018, now U.S. Pat. No. 10,402,710, which is a continuation-in-part under 35 U.S.C. § 120 of U.S. patent application Ser. No. 15/690,597, filed on Aug. 30, 2017, which is a continuation of U.S. patent application Ser. No. 13/854,580 filed on Apr. 1, 2013, which is a continuation of U.S. patent application Ser. No. 12/697,895 filed on Feb. 1, 2010, which claims the benefit of U.S. Prov. Pat. Appl. Ser. No. 61/149,654 filed on Feb. 3, 2009. The disclosures of these patent applications are hereby incorporated by reference in their entireties.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

In some circumstances tagged items have their tags removed, such as at point-of-sale for tagged retail items or when an item is removed from tagged packaging and the packaging is destroyed. In other circumstances tagged items retain their tags for specific or future uses such as retail-item returns to a store or tagged identity cards. In some cases, especially when the tag is retained on the item, the owner of the tagged item may not want unauthorized readers to be able to read or track the item, such as for privacy reasons. Most conventional tags are always capable of being inventoried; those that inhibit regular inventory typically require a password-based challenge-response authentication with a reader before allowing themselves to be inventoried. The former tag types pose privacy risks to their owners; the latter tag types require complex password-based authentication that adds complexity to the reader and to the tag and makes it difficult to use the tags unless the interrogating reader has knowledge of both the authentication algorithm and the tag's secret password.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to RFID tags capable of transitioning between a private state and one or more public states. In the private state, a tag may participate in an inventory round without restriction. In the public state or states the tag may be prevented from participating in an inventory round, allowed to participate in an inventory round but prevented from providing actual identifying information, or allowed to participate in the inventory round. Whether and how the tag responds in the public state may depend on certain conditions, such as if one or more of the tag's flags are asserted or deasserted. Embodiments are directed to tags being first selected in the public state for inventorying by verifying that the reader is authentic, genuine, or knows some information about the tag, and the tag then asserting or deasserting one or more of its flags accordingly. Embodiments are further directed to the asserted or deasserted flag or flags being those flags that determine whether and how a tag in the public state participates in an inventory round. According to further embodiments, a tag in the public state or states that is prevented from providing an actual identifier may respond to a reader with an alternative identifier in place of the tag's actual identifier.

According to one example, a method for an RFID integrated circuit (IC) configurable to operate in a private state and in a public state, and to transition at least from the private state to the public state, to determine whether to respond to an inventorying command to a reader, is provided. The method may include, when the IC is in the private state, receiving the inventorying command and responding to the inventorying command regardless of whether the reader is verified or unverified. The method may further include, when the IC is in the public state, receiving the inventorying command and responding to the inventorying command if the reader is verified, else not responding to the inventorying command.

According to another example, a method for an RFID IC configurable to operate in a private state and in a public state, and to transition at least from the private state to the public state, to determine whether to provide an identifier to a reader, is provided. The method may include, when the IC is in the private state, receiving a request for the identifier from the reader and providing the identifier regardless of whether the reader is verified or unverified. The method may further include, when the IC is in the public state, receiving the request for the identifier from the reader and providing the identifier if the reader is verified, else not providing the identifier.

According to a further example, an RFID IC configured to operate in a private state and in a public state, and to transition at least from the private state to the public state, is provided. The IC may include a transceiver configured to exchange radio frequency (RF) signals with a reader and a processor coupled to the transceiver. The processor may be configured to, when the IC is operating in the private state, receiving an inventorying command from the reader via the transceiver and respond to the inventorying command via the transceiver regardless of whether the reader is verified or unverified. The processor may be further configured to, when the IC is operating in the public state, receive the inventorying command from the reader via the transceiver, receive a code via the transceiver prior to receiving the inventorying command or included in the inventorying command, determined whether the received code is valid, and consider the reader verified and respond to the inventorying command if the received code is valid else not respond to the inventorying command.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

Figure 1:
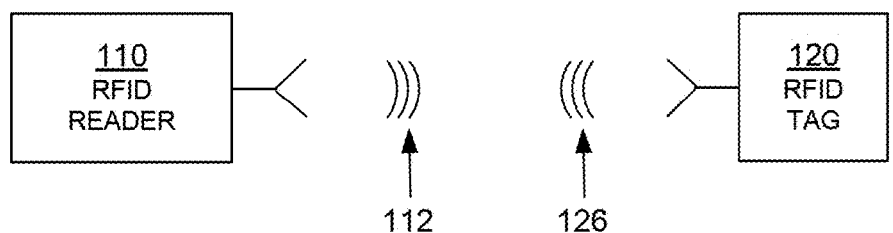
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120, which is near RFID reader 110, senses interrogating RF signal 112 and generates signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
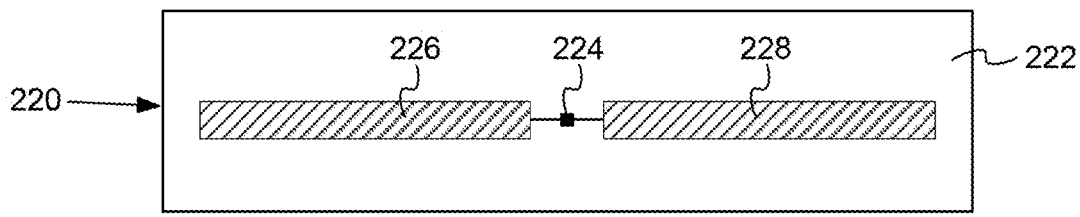
FIG. 2 is a diagram showing components of a passive RFID tag, such as a tag that can be used in the system of FIG. 1.
Figure 2:
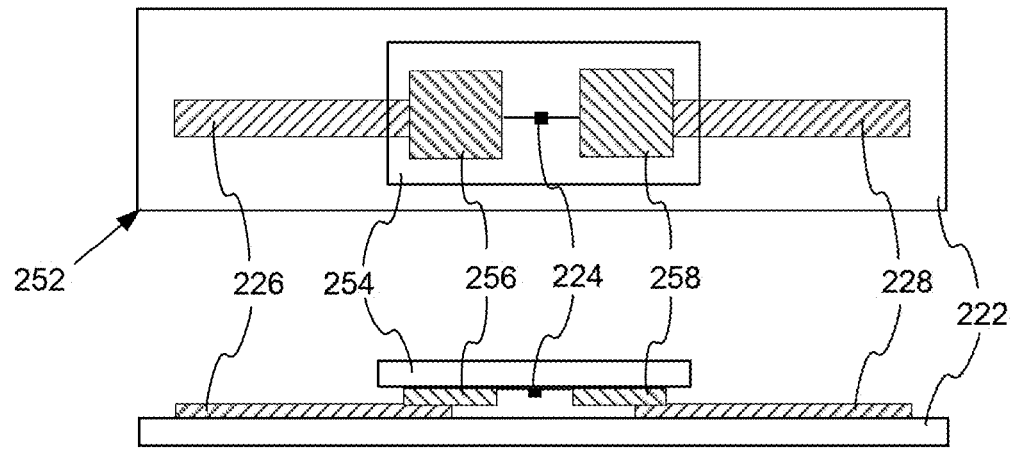
Figure 2:
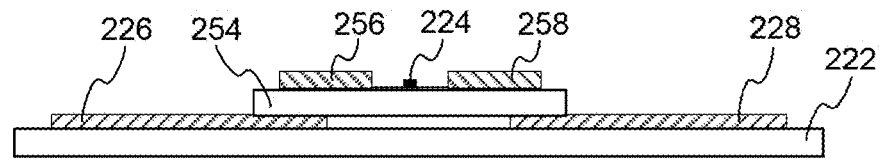

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which may both harvest power and respond if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by transmitting response signal 126.

In the embodiments of FIG. 2, antenna segments 226 and 228 are separate from IC 224. In other embodiments, the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

An RFID tag such as tag 220 is often attached to or associated with an individual item or the item packaging. An RFID tag may be fabricated and then attached to the item or packaging, or may be partly fabricated before attachment to the item or packaging and then completely fabricated upon attachment to the item or packaging. In some embodiments, the manufacturing process of the item or packaging may include the fabrication of an RFID tag. In these embodiments, the resulting RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. An "RFID IC" may refer to an item capable of receiving and responding to RFID signals. For example, an item having a separate but attached RFID tag can be considered an RFID IC, as is an item having an integrated RFID tag or an item manufactured to have the capabilities of an RFID tag. A standalone RFID tag may also be referred to as an "RFID IC".

The components of the RFID system of FIG. 1 may communicate with each other in any number of modes. One such mode is called full duplex, where both reader 110 and tag 120 can transmit at the same time. In some embodiments, RFID system 100 may be capable of full duplex communication if tag 120 is configured to transmit signals as described above. Another such mode, suitable for passive tags, is called half-duplex, and is described below.

Figure 3:
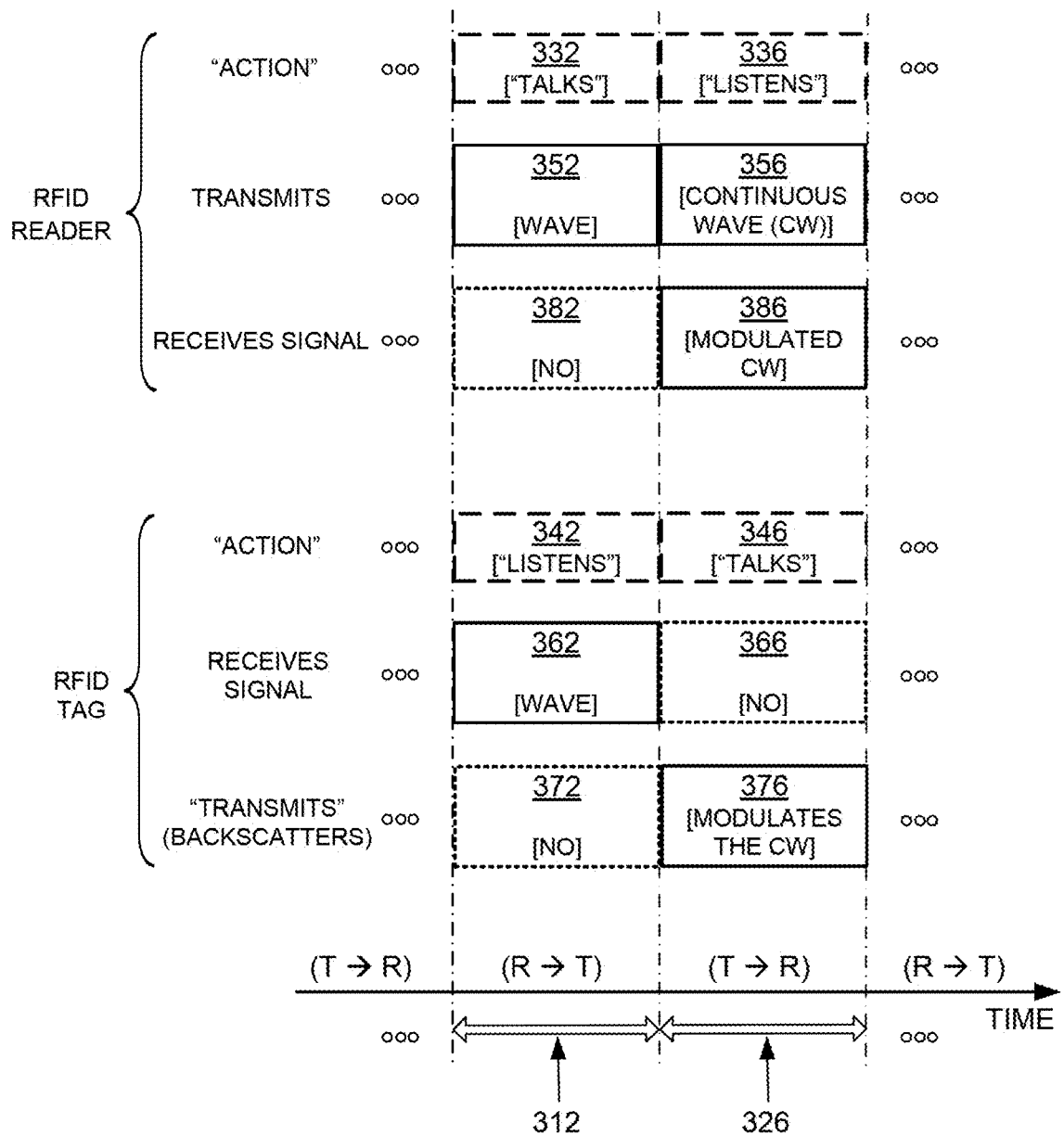
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Interval 312 may typically be of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, which may also be referred to as a backscatter time interval or backscatter interval, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126, for example by adjusting its antenna reflectance. Concurrently, according to block 386, reader 110 receives backscatter signal 126 and processes it.

Figure 4:
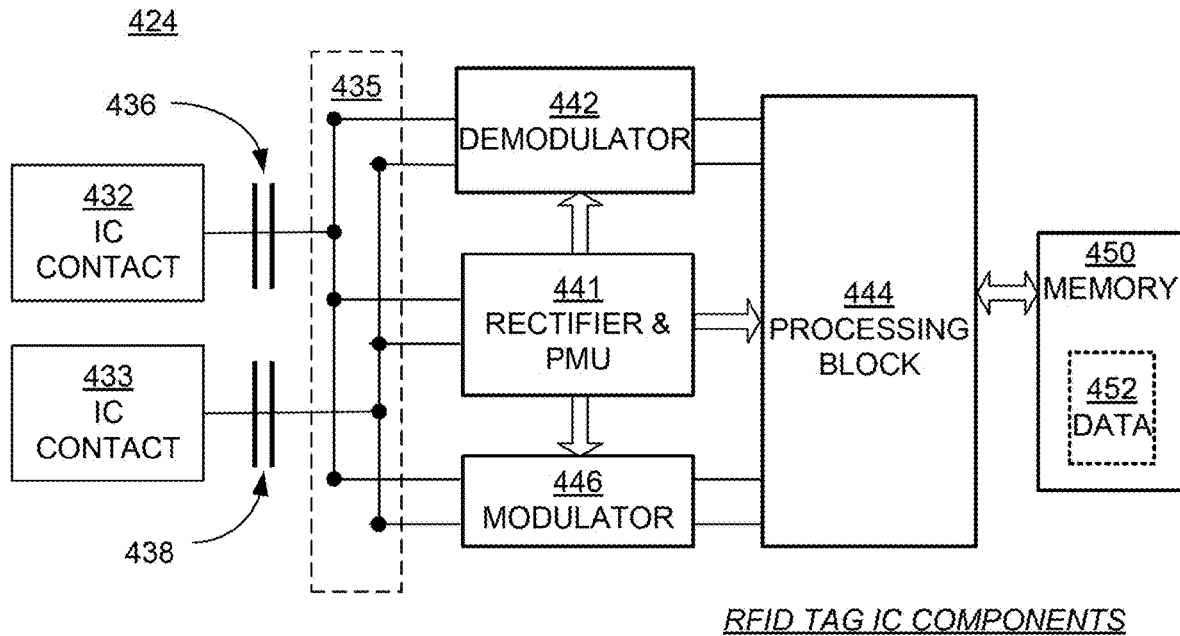
FIG. 4 is a block diagram showing a detail of an RFID tag, such as the one shown in FIG. 1.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art, and may include one or more components configured to convert an alternating-current (AC) or time-varying signal into a direct-current (DC) or substantially time-invariant signal.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a nonvolatile memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

Figure 5A:
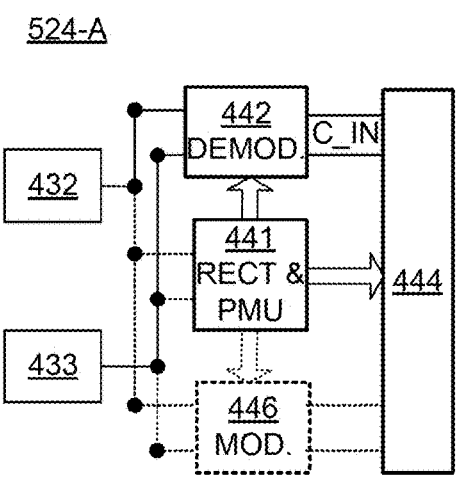
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

Figure 5B:
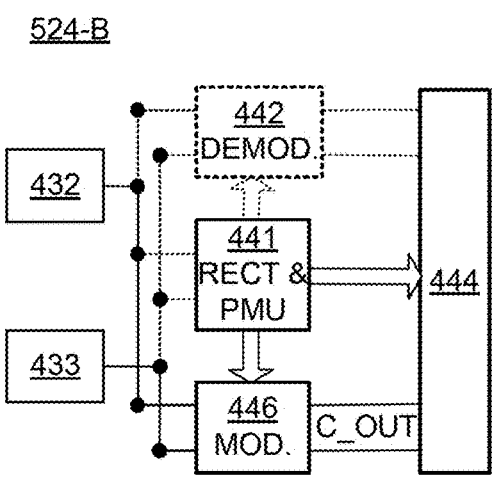

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
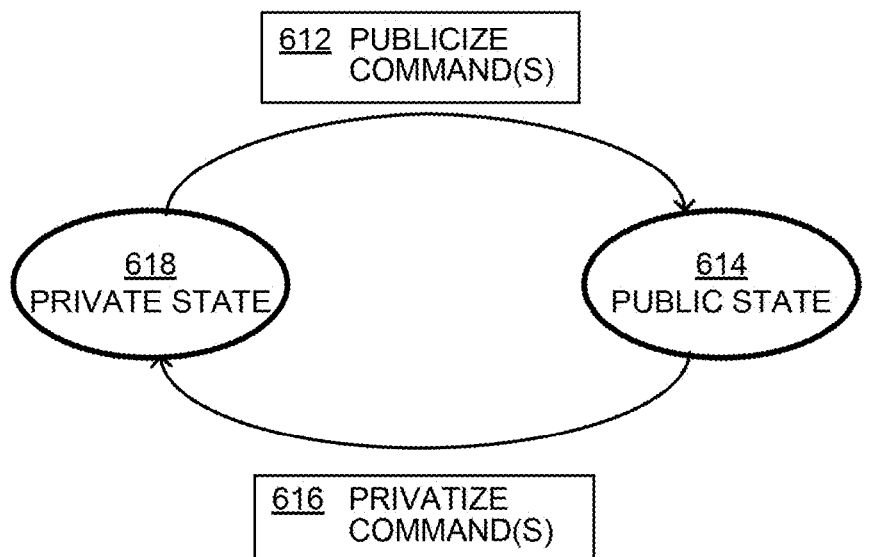
FIG. 6 illustrates how a tag can be switched between a public state and private state according to embodiments.

FIG. 6 illustrates how a tag can be switched between public and private states and back again, according to embodiments.

Normal RFID inventory operations permit a reader to determine, at least, the identity of a tag in its field-of-view unless the reader specifically and selectively takes action to exclude the tag from the inventorying. This ubiquitous inventory capability has the benefit of allowing a reader to identify all tags in its field of view, but has the disadvantage of permitting anyone to scan a tagged item and then locate it again later, raising privacy concerns and potentially providing useful information to thieves.

Figure 9:
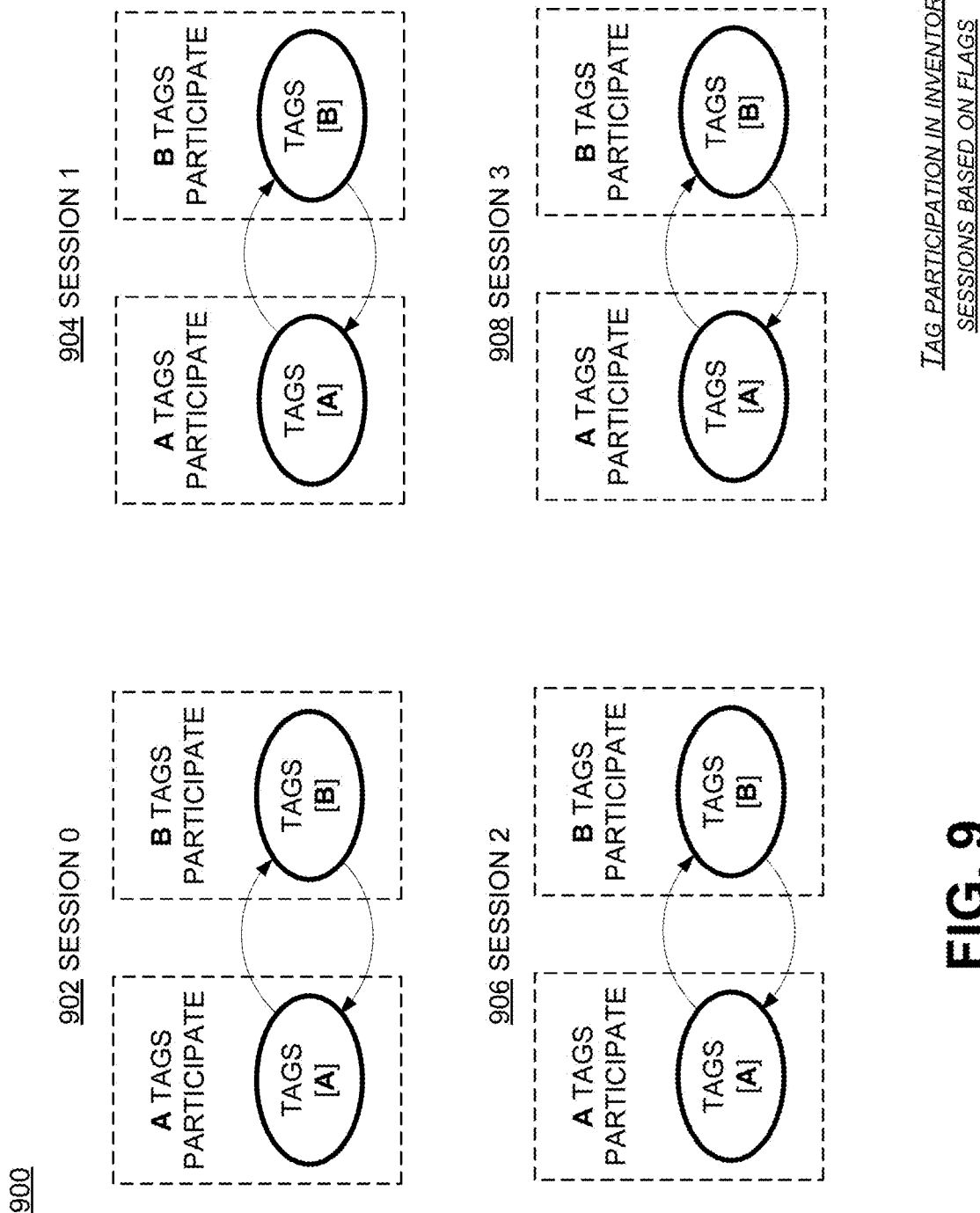
FIG. 9 illustrates how tags participate in inventory rounds according to the Gen2 Specification.

The mechanism by which a reader selectively inventories one or more tags while excluding other tags from the inventorying is called "selection". A reader selects one or more tags for inventorying while deselecting others. A reader may transmit one or more selection command, such as the Select command of the Gen2 Specification, to select a particular tag population based on user-defined criteria, enabling union (U), intersection (∩), and negation (~) based tag partitioning. Readers perform ∩ and U operations by issuing successive selection commands. A selection command can assert or deassert a tag's SL flag, or it can set a tag's session flag to either A or B in any one of four sessions as discussed in more detail below (FIG. 9 and FIG. 10 and associated description). A reader may then issue an inventorying command, such as the Query command of the Gen2 Specification, to perform an inventory operation. The inventorying command may specify a session and a session flag value (A or B) in that session; it may also use the SL flag. Readers may inventory SL or ~SL tags, or they may choose to not use the SL flag at all. The tag replying to the inventorying command with an actual identifier is said to be "inventoried".

As mentioned previously, embodiments are directed to RFID tags and tag chips with the ability to transition between states (i.e. public and private states) and to adjust their responses to readers depending on their state and their flag value(s). In certain states a tag will not respond to a reader or will not provide an actual identifier to the reader unless the reader has first provided information indicating that the reader is authorized to interact with the tag(s). In some embodiments the reader provides this information using a selection command.

As shown in diagram 600, a tag according to some embodiments may be capable of being in one of two states: a public state 614 and a private state 618. In public state 614 the tag may act more carefully because it is in "public" and so it may restrict the information it provides to a reader or may not respond at all until the reader has proven itself to be an authorized reader. A reader may prove that it is authorized by, for example, proving that it knows some information about the tag, or proving that it is a reader that the tag knows is authorized. A reader that is authorized is referred to herein as a "verified" reader, proving that a reader is authorized is referred to herein as "verifying" the reader, and information used for verifying a reader may be referred to herein as "verification information" or "verification data". In some circumstances the tag may reply with a partial or scrambled identifier until the reader verifies itself, after which the tag will provide an actual identifier. The actual identifier is a quantity that identifies the tag, the item to which the tag is attached, or the holder of the tag. Actual identifiers can be a numeric or alphanumeric EPC, TID, password, code, secret, memory content, or similar.

In private state 618, the tag may act less carefully, because it is in a private location where a rogue reader is not expected to be operating. In this case the tag may operate "normally" and participate in inventory rounds without restriction, providing the information requested by the reader such as its actual identifier, or any other information stored in tag memory.

The tag may transition between public state 614 and private state 618 and back again in response to privatize command(s) 616 and publicize command(s) 612, respectively, received from a reader. The privatize command(s) 616 and publicize command(s) 612 may be custom commands, custom selection commands, a write command writing data into a tag memory location, or any other command suitable for causing a tag to transition between public state 614 and private state 618. In some embodiments the privatize command and the publicize command are one and the same, in which case the single command may include one or more fields that instruct the tag to privatize itself or publicize itself. Regardless of whether the privatize and publicize commands are combined or separate, they may contain additional information such as verification information, other information known to the tag, and/or an indicator for which public state the tag should choose from a plurality of public states, and may cause the tag to perform other operations as well. According to some embodiments the tag may transition states in response to a reader command only if the reader has first proven itself to be authorized, such as by providing valid verification information or verifying itself via a cryptographic exchange.

Figure 7:
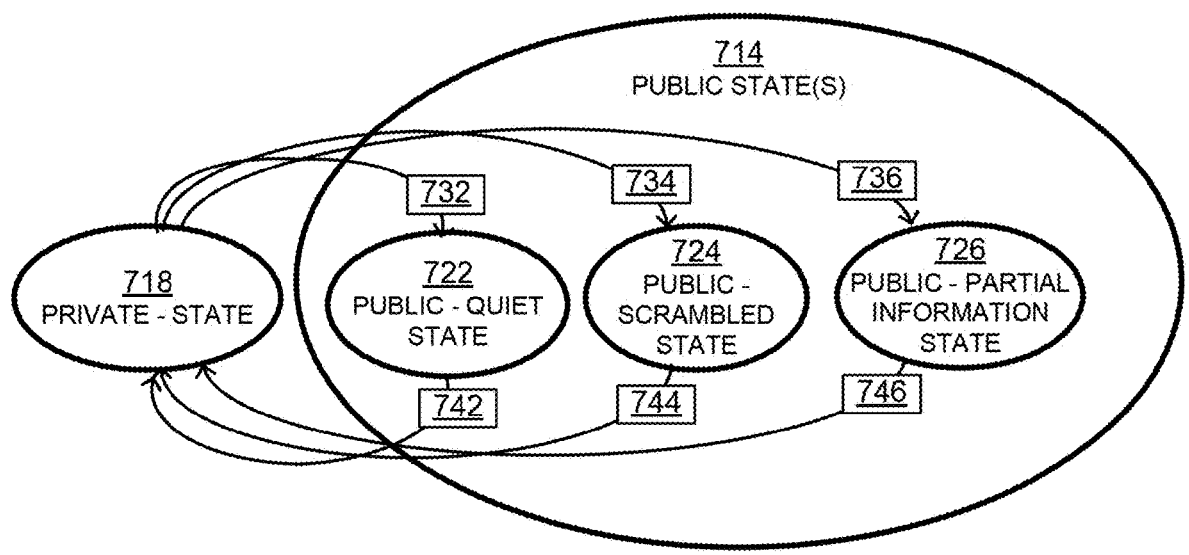
FIG. 7 illustrates how a tag can be switched from a private state to a plurality of public states and back according to embodiments.

FIG. 7 illustrates how a tag can be switched from a private state to one of a plurality of public states and back again according to embodiments.

As shown in diagram 700, a tag may have access to more than one public state. The different public states may alter the information a tag provides to a reader, as well as alter how the tag operates. For example, for an unauthorized reader a tag may remain silent in a first public state, provide a random or scrambled or encrypted identifier in a second public state, provide only partial information in a third public state, and so on. Once a reader has been verified, the tag may respond to the reader within an inventory round just like any tag that does not implement the public/private capability. For example, the tag may provide full and complete information to a verified reader. However, in some embodiments the verified reader may still have limited access to some tag memory contents depending on the tag state.

To verify itself to the tag, a reader may send verification information to the tag that may indicate that the reader "knows' which tag it is speaking with. This verification information may be sent in a Select command that precedes an inventory operation, or in an inventorying command sent during the inventory operation. Alternatively, the reader may use a custom command to provide the tag with the verification information. Verification information may include a string, a code, a PIN, a password, a cryptographic quantity such as an electronic signature (e.g., a digital signature generated using asymmetric cryptography or a message authentication code generated using symmetric cryptography), encrypted data value, or key, or any other information known to the tag and used to verify readers. Verification information may be stored in a part or all of the EPC memory, a part or all of TID memory, a part or all of User memory, or optionally a part of Reserved memory. Verification information may be unique to the tag or may be shared among multiple tags. In the latter situation, the verification information may be referred to as "group verification information", "group passwords", "group PINs", "group keys", or similar, because it can be used to verify an entity or reader to multiple (a "group" of) tags. The tag may have rules about how much verification information it deems sufficient for a reader to be verified. These rules may be built into the tag or defined during tag programming, when the tag is interrogated by a prior reader, or by any other means.

In some embodiments, a reader may verify itself to the tag based on a cryptographic key. For example, the tag may have a tag key, and the reader may verify itself to the tag by proving to the tag that the reader has knowledge of the tag key, such as via a challenge/response interaction or electronic signature exchange. In one embodiment, the tag may send a random value (known as a "salt"), and the reader may encrypt or otherwise cryptographically secure the salt with the tag key and send the secured salt back to the tag. The tag, upon successfully recovering the salt using its tag key, can then verify that the reader knows the tag key. As another example, the tag may have knowledge of keys for authorized readers, and a reader may verify itself to the tag by proving to the tag that it has knowledge of an authorized reader key.

Diagram 700 illustrates an example set of public states that may be used by an RFID tag. Private state 718 is similar to private state 618 described in FIG. 6, where a tag may freely participate in an inventory round (regardless of or based on its flags) and provide its identifier and other information to an interrogating reader, regardless of the reader verification status. In public—quiet state 722, the tag may not respond to an unverified interrogating reader. In public—scrambled state 724, the tag may provide a random or scrambled response to an unverified interrogating reader. In public—partial information state 726, the tag may provide only partial identifying information in response to an unverified interrogating reader.

Transitioning from private state 718 to public states 722, 724, and 726 may be caused by respective reader commands 732, 734, and 736. Similarly, transitioning from public states 722, 724, and 726, to private state 718 may be in response to respective reader commands 742, 744, and 746.

Figure 8:
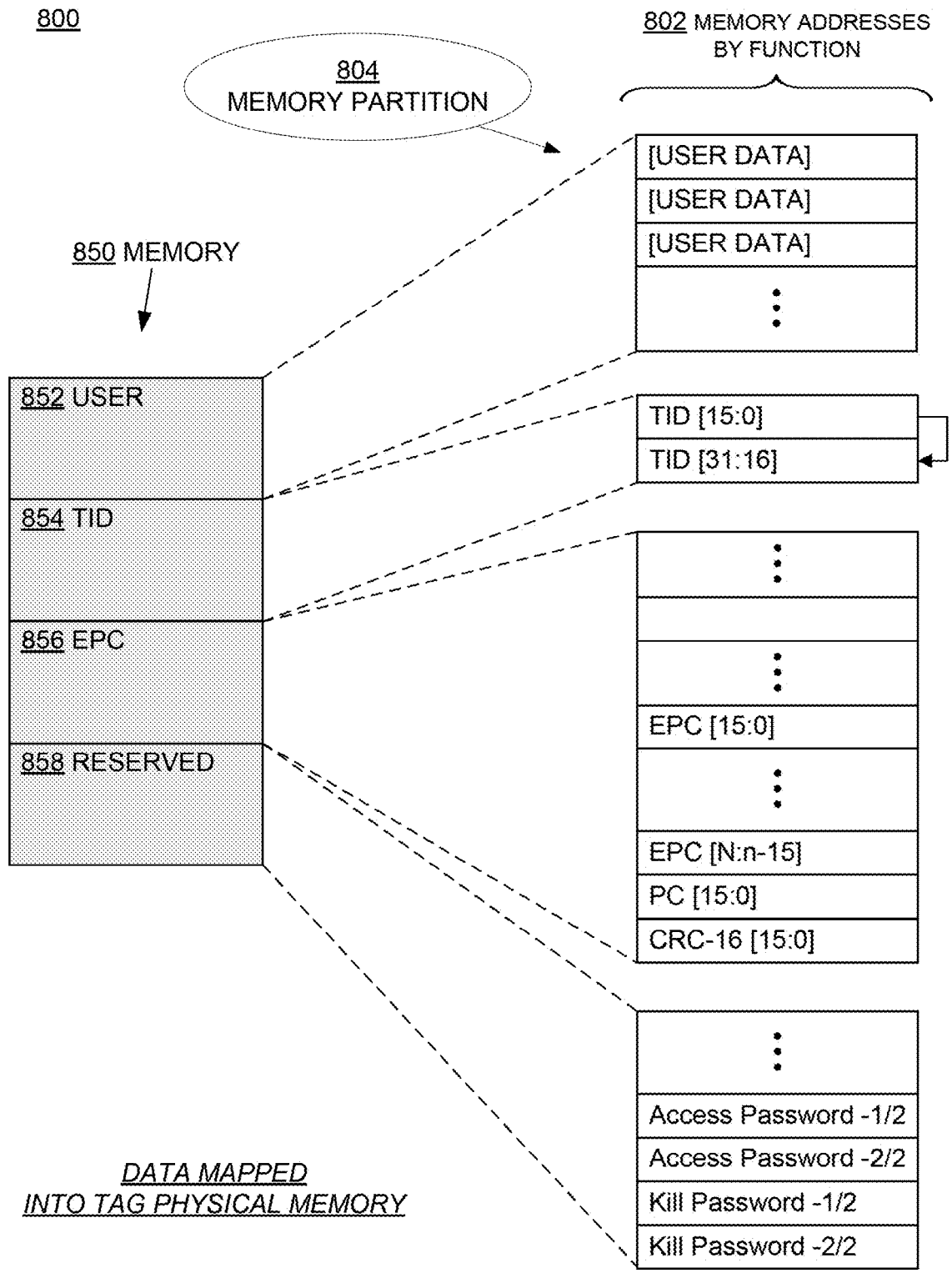
FIG. 8 is a diagram illustrating how a tag physical memory such as the memory shown in FIG. 4 can be partitioned and organized.

FIG. 8 is a diagram 800 illustrating how a tag physical memory such as the memory shown in FIG. 4 can be partitioned and organized for data, such as one or more tag identifiers, to be stored into it.

Tag memory 850 may be partitioned logically. The data stored in memory partitions 804 may include user data in partition 852, an identifier for the tag itself (for example, a TID) in partition 854, an identifier associated with an item to which the tag is attached (often an electronic product code or EPC) in partition 856, and information such as passwords that are reserved for the tag itself in partition 858. In other embodiments, memory 850 may be partitioned in other ways with fewer or more partitions, or not partitioned at all. Data may be stored in the memory during tag manufacturing or during an operation by processing block 444 of FIG. 4, typically in response to a command received from a reader. Processing block 444 may also access the stored information. Verification information known to the tag, as described herein, may be stored in any suitable partition or region of tag memory 850. For example, verification information may be stored in partitions 852 and/or 858, and even in partitions 854 and 856 if space permits.

Information stored in memory 850 may be used in tag operations. For example, EPC partition 856 can be arranged to store a CRC-16 (cyclic redundancy check) for the item identifier, protocol control (PC) information that identifies parameters of the item identifier, and the item identifier itself. The tag may provide information stored in its memory, such as the item identifier, in response to an inventory command if the tag state and flag conditions are satisfied as discussed in more detail below.

FIG. 9 illustrates how tags participate in inventory rounds according to the Gen2 Specification.

In an RFID system according to Gen2 Specification, a reader performs an inventory round in one of four sessions 902 (session 0 or S0), 904 (session 1 or S1), 906 (session 2 or S2), and 908 (session 3 or S3) with associated session flags. Tags participate in only one session during the round. Tags maintain a session flag (S0, S1, S2, and S3) for each session. Each of the session flags may have one of two values, A or B. For clarity, we will use the terms "asserted" and "deasserted" to describe the states of a flag, rather than A or B, regardless of whether the flag is a session flag, a selected (SL) flag, or another flag. Note that the choice of flag polarity is immaterial—assigning A to asserted and B to deasserted is just acceptable as assigning A to deasserted and B to asserted—as long as an RFID system uses the assignment polarities consistently.

At the beginning of each inventory round a reader may choose to inventory either asserted (A) or deasserted (B) tags in one of the sessions. Tags participating in an inventory round in one session do not use or modify the session flag for a different session. The session flags are a resource a tag provides separately and independently to a given session. The inventorying command that a reader uses to inventory tags may contain a field to specify the session (S0, S1, S2, or S3) as well as the polarity (asserted or deasserted) that the session flag must have for the tag to participate in the inventory round.

A tag according to the Gen2 Specification also implements a selected flag, SL, which a reader may assert or deassert using a selection command such as the Gen2 Select command. A Sel parameter in an inventorying command such as the Gen2 Query command allows the reader to inventory tags that have SL either asserted or deasserted (i.e. SL or ~SL), or to ignore the flag and inventory tags regardless of their SL value. SL is not associated with any particular session, may be used in any session, and is common to all sessions.

Thus, a tag according to embodiments may employ one or more flags that determine whether the tag will participate or not participate in an inventory round. The flags may include S0, S1, S2, S3, SL, and optionally a custom flag. A reader may cause a tag to assert or deassert one or more of the S0, S1, S2, S3, SL, or custom flags using a selection command, a custom command, or a memory write. For example, a tag receiving a selection command may assert or deassert one of S0, S1, S2, S3, or SL depending on whether the selection command comes from a verified reader or if verification data in the selection command matches or mismatches a memory on the tag.

In one embodiment, the selection command may assert a deasserted flag, or deassert an asserted flag, based on a match or mismatch between the string sent in the selection command and a value in tag memory. As described above, when a tag according to embodiments is in the public state, the tag may have different rules for the selection command than when the tag is in the private state. For example, in the public state the tag may enforce a minimum verification data length for matching without which the tag will not modify a flag value; the tag may decline to modify a flag value based on a mismatch, and so on.

According to an example scenario, a reader verifies itself to a tag in the public state before or while asserting one of the tag flags (say, S1). The reader may verify itself via a cryptographic interaction (for example, by providing a known value, such as a salt, encrypted or signed with a key known to the tag) or by proving that it knows some information about the tag. For example, the reader may send a command with verification data (e.g., a string, code, PIN, key, salt, etc.) that matches verification data stored on the tag. The reader thereby indicates that it knows something about the tag, thereby verifying the reader to the tag. In this situation the sent verification data is the mechanism by which the tag verifies the reader. This mechanism helps ensure that the reader is not a rogue by the reader proving that it already knows something about the tag. If the tag determines that the reader is verified, it asserts the S1 flag. The reader then queries (e.g., sends an inventorying command to) tags with an asserted S1 flag, and the tag responds with its actual identifier. Absent the flag being asserted, the tag would not normally respond.

In some embodiments, the tag enforces a minimum matching bit length or threshold for the sent verification data and the verification data stored on the tag. If the sent verification data is not at least the minimum bit length, or if the sent verification data does not match the stored verification data for at least the minimum bit length, then the tag may consider the reader unverified. The minimum bit length may be in terms of consecutive bits—for example, sent verification data containing a sequence of consecutive bits that both satisfies (e.g., meets or exceeds) the minimum bit length and matches the stored verification data may be sufficient to verify the reader. In general, the more bits the tag requires in the sent verification data the less likely a rogue reader can guess the verification data. In some embodiments, there may be multiple minimum matching bit lengths, with different authorizations and permissions associated with each bit length. For example, a reader that provides a shorter length of matching verification data may be "less verified" than a reader that provides a longer length of matching verification data, and "less verified" readers may be granted fewer privileges or less access with respect to a tag than readers that provide more verification data. Such privileges and access may include accessible identifier length, accessible data length, accessible tag memory portions, access to coupled devices or components, access to tag features or functionality, verification time durations or timeouts, memory write privileges, read ranges, or any other privilege or access associated with a tag.

In some embodiments, a tag enforces additional security conditions before determining that a reader is verified. For example, in order to prevent a reader from simply bombarding the tag with different verification data until the tag receives suitable verification data, the tag may consider a reader verified only if the reader sends correct verification data without having immediately prior sent one or more other, incorrect pieces of verification data. The tag may determine whether a previous piece of verification data was received "immediately prior" to a correct piece of verification data based on elapsed time, whether another command such as an inventorying command was received between the previous piece of verification data and the correct piece of verification data, or any other suitable method. In one embodiment, a tag that receives an incorrect piece of verification data from a reader may invoke a timeout, and may not respond to verification requests or other commands from the reader or any other reader until expiration of the timeout. In some embodiments, a tag that receives an incorrect piece of verification data from a previously verified reader may revoke the verification of the reader and subsequently consider the reader unverified until the reader has again verified itself to the tag.

Another security condition that a tag may enforce is physical proximity. For example, a tag may consider a reader verified if the reader sends correct verification data, the reader is in close physical proximity, and all other security conditions have been met. The tag may determine whether the reader is in close physical proximity based on the power of a received reader command, whether the reader command was received on a tag antenna configured to only receive close-range signals, or using any other means to determine reader proximity.

To enhance security, a tag whose flag was asserted by a verified reader is not desired to later respond to another, unverified reader. Consequently, the tag may deassert its flag after it has finished its dialog with the reader. In some embodiments the verified reader may reset the flag to its deasserted value when the reader has concluded its dialog with the tag. In other embodiments the tag flags may be constructed to decay, after a period of time, to the deasserted state. This decay ensures that a tag whose flag was asserted may, after the decay time, be no longer responsive to a reader unless the reader again verifies itself and reasserts the flag. In this latter fashion the tag can be made to be fail-safe, such that if a reader forgets to deassert the flag the tag may itself deassert the flag after a decay time. In some embodiments, a tag that receives an incorrect piece of verification data from a previously verified reader may also deassert the flag in addition to revoking the verification of the reader.

FIG. 10A through 10D illustrate example tag behaviors based on flag values and tag states according to various embodiments.

Figure 10A:
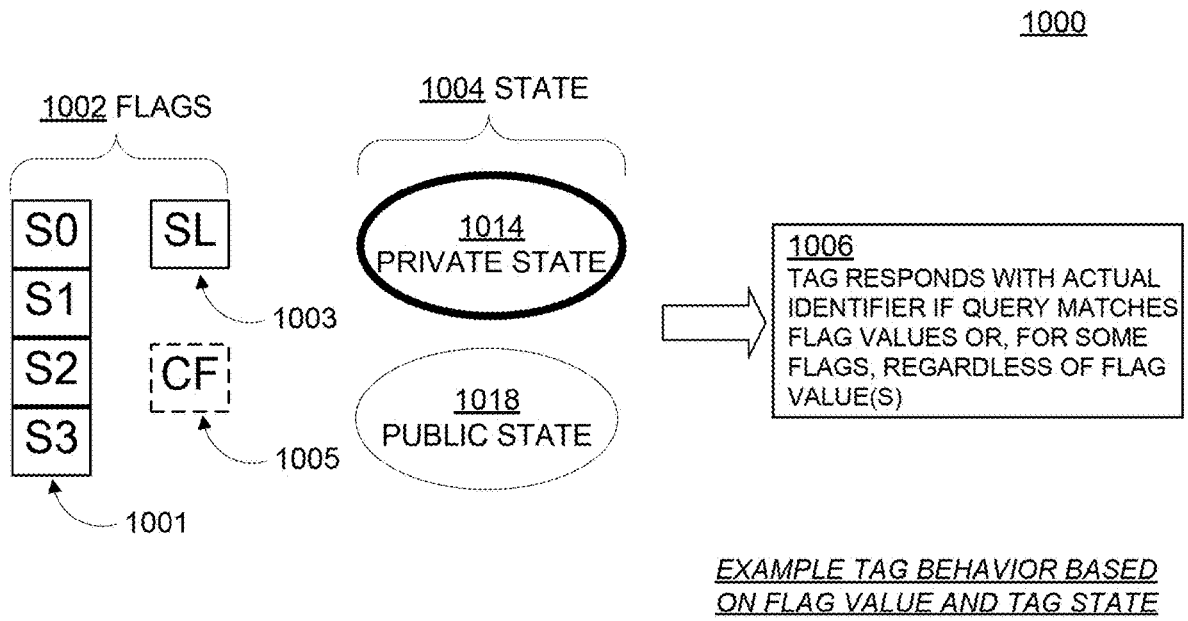
FIG. 10A through 10D illustrate example tag behaviors based on flag values and tag state according to various embodiments.

As shown in diagram 1000 of FIG. 10A, a tag may have a plurality of flags 1002 including a bank of session flags 1001, SL flag 1003, and an optional custom flag (CF) 1005. One or more of these flags may be asserted or deasserted as discussed above. The tag will also have a state 1004, which according to embodiments can be public or private. The flag values 1002 and the tag state 1004 determine a behavior of the tag in its interactions with a reader.

In an inventory round, a reader may send an inventorying command to the tag specifying one of S0, S1, S2, S3, and for this one flag the reader specifies whether it wants tags with flag values of A or B (asserted or deasserted) to respond. The reader may also specify SL, ~SL, or don't care for the SL flag. Custom flags may be employed in a manner similar or different from the above-described behavior. When in the private state 1014, the tag may respond according to Gen2 Specification (i.e. participate in the round if its flag value matches the inventorying command).

FIG. 10A illustrates example tag behavior in private state 1014. In state 1014 a tag behaves in one of four ways (1006): (1) if a particular flag is asserted and a reader queries tags with that flag asserted then the tag responds with its actual identifier; (2) if a particular flag is deasserted and a reader queries tags with that flag deasserted then the tag responds with its actual identifier; (3) if a reader queries tags irrespective of a flag value then the tag responds with its actual identifier, or (4) regardless of the foregoing, if any of the flags specified in the inventorying command are mismatched from the actual tag values then the tag will not respond. Of course, a combination of the session flags 1001, SL flag 1003, and or the custom flag 1003 may be specified and used in determining whether the tag participates in an inventory round.

Figure 10B:
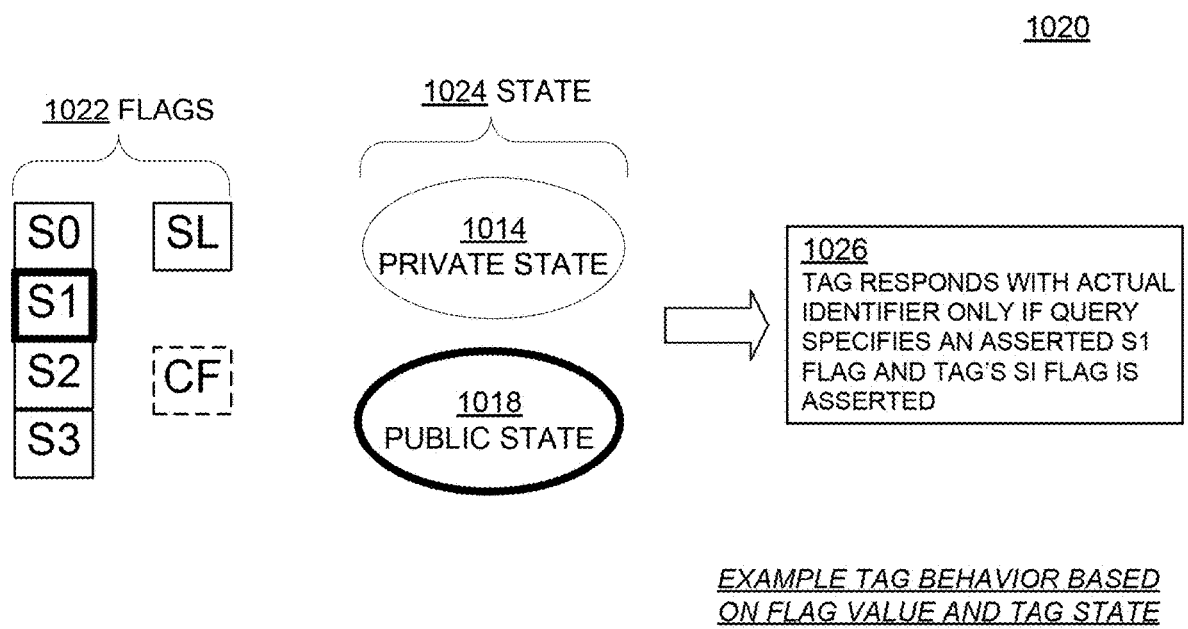
Figure 10C:
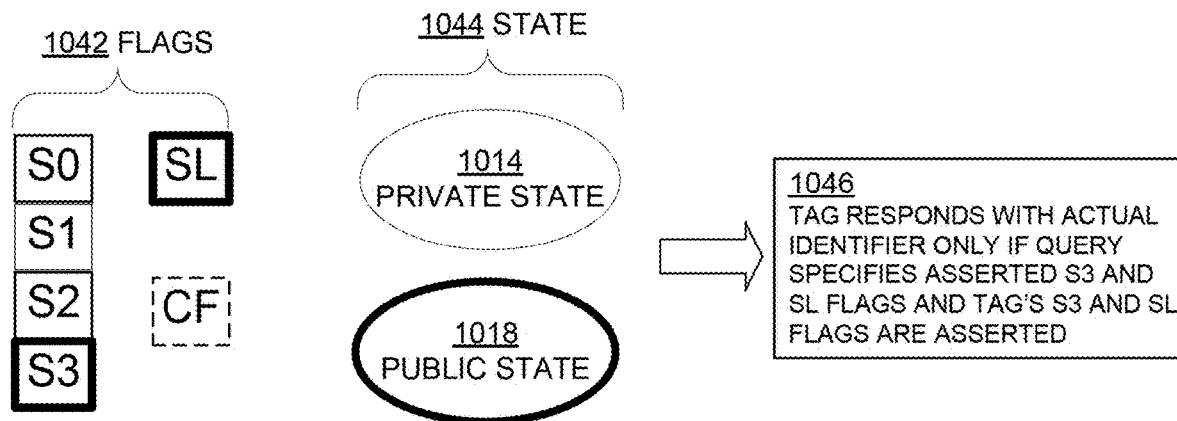
Figure 10D:
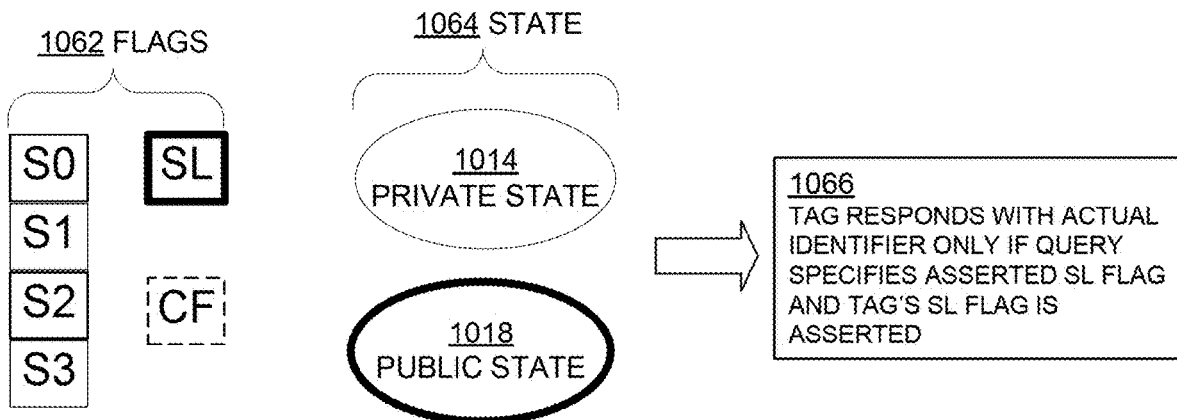

FIG. 10B through 10D illustrate example tag behavior in public state 1018, where one or more of the flags (bolded), chosen by the reader via its inventorying command, are used in conjunction with the public tag state as a "security gate" to determine the tag behavior for the inventory round. When in public state 1018 the tag may behave in one of the following three ways: (1) if a flag is asserted and the reader queries tags with that flag asserted then the tag responds with its actual identifier; (2) if a flag is deasserted and the reader queries tags with that flag deasserted and the inventorying command does not also specify a matching asserted flag then the tag may remain silent or may respond with scrambled, partial, or random (such as an RN16 of the Gen2 Specification) information; and (3) regardless of the foregoing, if any of the flags specified in the inventorying command are mismatched from the actual tag values then the tag will not respond. In the present example, to maintain the "security gate", if the reader queries tags with more than one flag specified in the inventorying command then at least one of these flags must be asserted in the inventorying command and likewise asserted on the tag in order for the tag to respond with its actual identifier.

In the example scenario of diagram 1020 of FIG. 10B, session flag 51 of tag flags 1022 is asserted and tag state 1024 is public state 1018. The tag responds with its actual identifier only if the inventorying command specifies an asserted S1 flag.

In the example scenario of diagram 1040 of FIG. 10C, session flag S3 and selected flag SL of tag flags 1042 are asserted and tag state 1044 is public state 1018. The tag responds with its actual identifier only if the inventorying command specifies asserted S3 and SL flags.

In the example scenario of diagram 1060 of FIG. 10D, selected flag SL of tag flags 1062 is asserted and tag state 1064 is public state 1018. The tag responds with its actual identifier only if the inventorying command specifies an asserted SL flag.

Figure 11:
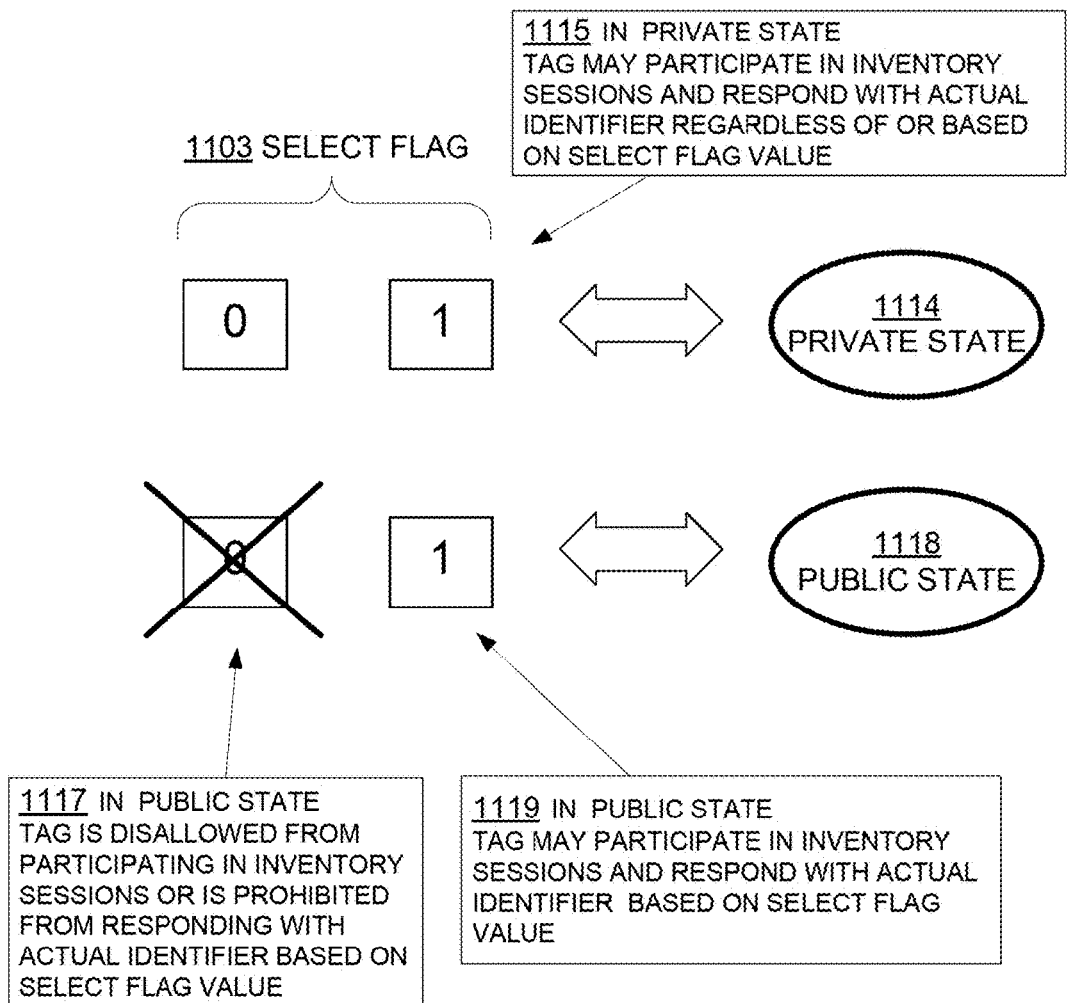
FIG. 11 illustrates an example of how select flag value and tag state result in tag participation or non-participation in inventory rounds and/or whether the tag responds with its actual identifier according to an example embodiment.

FIG. 11 illustrates how tag state and select flag value result in tag participation or non-participation in inventory rounds according to an example embodiment.

Diagram 1100 is a detailed illustration of the example scenario of FIG. 10D. According to a first example, when a tag is in private state 1114 it may participate in inventory rounds and responds with its actual identifier based on or regardless of the value of its select flag 1103 as indicate by reference numeral 1115. If a reader queries tags with an asserted or deasserted select flag, the tag may participate if and only if its actual select flag value matches that specified in the inventorying command. If the reader queries tags without specifying a select-flag value then the tag may respond regardless of its actual select-flag value.

The second example assumes that none of the S0, S1, S2, S3, or CF flags are asserted and acting as a "security gate" for the tag. According to this second example, when a tag is in public state 1118 and its select flag is deasserted (i.e. "0") it is either prevented from participating in an inventory round or prevented from participating with its actual identifier, as indicated by reference numeral 1117. If a reader queries tags with deasserted select flags then the tag will either not respond or will respond with partial or scrambled information. If the reader queries tags with asserted select flags the tag will not respond.

According to a third example, which also assumes that none of the S0, S1, S2, S3, or CF flags are asserted and acting as a "security gate" for the tag, when a tag is in public state 1118 and its select flag is asserted (i.e. "1") it may participate in an inventory round, as indicated by reference numeral 1119. If a reader queries tags with asserted select flags then the tag may respond with its actual identifier.

Whereas a conventional tag participates in an inventory round if a reader queries tags with matching flags, a tag according to the present invention exhibits state-dependent behavior. When in the private state, it participates according to the rules of a conventional tag. When in the public state, it participates only if a reader first asserts a flag, and it enforces conditions on the reader attempting to perform the asserting. Specifically, the tag requires that the reader verify itself, either by proving knowledge of a cryptographic key known to the tag or by providing verification data that the tag can use to verify the reader. A rogue reader will not be able to verify itself and will either be unaware that the tag is present, or will receive scrambled or random information so as to make the tag unrecognizable and untraceable, thereby protecting the privacy of the tag owner.

Figure 12:
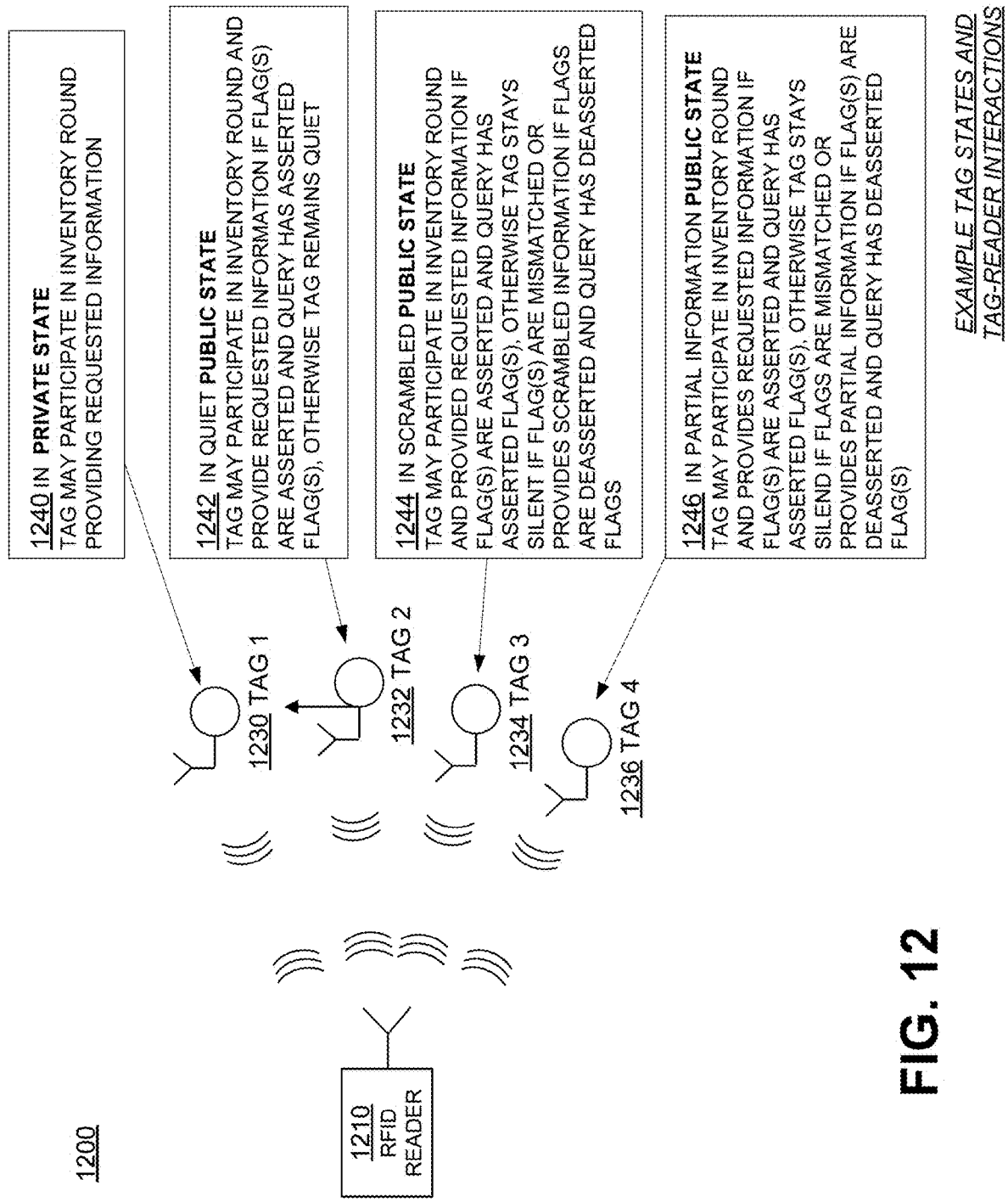
FIG. 12 illustrates example tag state and tag-reader interactions according to some embodiments.

Diagram 1200 of FIG. 12 illustrates example tag states and tag-reader interactions according to some embodiments.

According to the first example scenario 1240, tag 1230 is in a private state and participates in inventory rounds providing its actual identifier (e.g. actual EPC, actual TID, or other memory contents) to reader 1210 if its flag values match those specified in an inventorying command issued by the reader. Otherwise the tag remains silent.

According to the second example scenario 1242, tag 1232 is in a quiet public state in which the tag participates in an inventory round and provides an actual identifier only if one or more of its flags are asserted and its flag values match those specified in an inventorying command issued by the reader. Otherwise the tag remains silent.

According to the third example scenario 1244, tag 1234 is in a scrambled public state in which the tag participates in an inventory round and provides an actual identifier only if one or more of its flags are asserted and its flag values match those specified in an inventorying command issued by the reader. If the tag flags are asserted but the inventorying command specifies these same flags deasserted then the tag does not respond. If the tag flags are deasserted and the inventorying command specifies these same flags deasserted then the tag replies with scrambled, random, encrypted, or otherwise garbled information.

According to the fourth example scenario 1246, tag 1236 is in a partial-information public state, in which the tag participates in an inventory round and provides an actual identifier only if one or more of its flags are asserted and its flag values match those specified in an inventorying command issued by the reader. If the tag flags are asserted but the inventorying command specifies these same flags deasserted then the tag does not respond. If the tag flags are deasserted and the inventorying command specifies these same flags deasserted then the tag replies with partial information.

The verification data known to the tag and used to verify readers may be stored on the tag in any suitable fashion. In one embodiment, the verification data may be written on the tag during RFID IC or tag manufacture. In some embodiments, the verification data may be written on the tag by a subsequent user or owner of the tag. The verification data, once written to tag memory, may be rewritable or not. For example, the verification data may be written to a memory or memory location that permits overwriting. In this case, the verification data may be changed later. As another example, the verification data may be written to a one-time-programmable memory that cannot be physically overwritten or changed without damaging the memory or the IC. In this case, the verification data, once written, cannot be changed later. The written verification data may be externally readable (e.g., readable by a reader) or not (e.g., only readable by the tag). The latter may be preferable for privacy concerns and to prevent unauthorized readers from inadvertently or maliciously reading the verification data.

An RFID tag may store one or more pieces of verification data, some of which can be overwritten and some of which cannot. For example, first verification data may be permanently written to an RFID IC or tag during manufacture, such that the first verification data cannot be subsequently overwritten or changed. The first verification data may be used to verify readers or entities. Subsequently, a verified reader or entity (e.g., a reader or entity with knowledge of the first verification data) may be able to write second verification data to the RFID IC or tag. The second verification data may be mutable, such that a suitable verified reader or entity (e.g., a reader or entity with knowledge of the first and/or second verification data) can subsequently change the second verification data.

When an entity legitimately acquires an RFID tag or its associated item, the acquiring entity ("acquirer") may be provided with some or all of the verification data stored on the tag. For example, if only first verification data as described above are stored on the tag, then the acquirer may be provided with the first verification data. If first and second verification data as described above are stored on the tag, then the acquirer may be provided with the first and/or the second verification data.

If only first verification data as described above are stored on the tag, then in some embodiments an acquirer may not be provided with the first verification data, but rather with a means to store second verification data on the tag without explicit knowledge of the first verification data. For example, the acquirer may be able to store second verification data on the tag through a remote service. In this example, the acquirer, upon verifying its identity to the service, provides an identifier for the tag and optionally the second verification data to the service. The service knows the first verification data stored on the tag and uses the first verification data to generate a message that allows the tag to accept the second verification data. The message may include the second verification data, or may instruct the tag to accept data accompanying the message as second verification data. In some embodiments, the message may be encrypted or otherwise obfuscated based on at least the first verification data, such that the acquirer cannot derive the first verification data from the message. The service then either sends the message directly to the tag if possible, or sends the message to the acquirer, and the acquirer can provide the message to the tag to store the second verification data on the tag.

In some embodiments, an acquirer may write updated verification data to a tag, to replace or augment first and/or second verification data already on the tag. For example, if a customer receives first or second verification data for a tag upon purchasing the item associated with the tag, the customer may use the received verification data to authorize the writing of updated verification data to the tag. The updated verification data may be an acquirer-generated password, an acquirer-generated PIN, an acquirer cryptographic key, or any other data the acquirer wishes to use for restricting access to the tag. In some embodiments, the acquirer may have a number of tagged items, and may use the same updated verification data as "group verification information" for multiple or all of the tagged items, to facilitate inventorying.

The updated verification data may be written onto the tag in addition to any preexisting verification data, or may overwrite some or all of any preexisting verification data. For example, if the tag already stores first and second verification data, the updated verification data may overwrite the first, the second, or both verification data. In some embodiments, some of the preexisting verification data may be permanent and cannot be subsequently overwritten or changed, as described above. This provides a mechanism for another entity, such as an IC or tag manufacturer or a retailer, to reset the tag, for example in the case of a returned item.

The acquirer may then use the received or updated verification data to prevent unauthorized readers from retrieving information from the tag. For example, an owner of an item with an RFID tag may allow only readers associated with the owner to inventory the tag. The owner may either use the received verification data to publicize the tag or first write updated verification data to the tag and then use the updated verification data to publicize the tag. Subsequently, only readers associated with or belonging to the owner and presumably knowing the received or updated verification data can retrieve information from the tag.

As an example, a customer that has purchased an item associated with an RFID tag from a retailer may not want unauthorized readers to retrieve information from the tag, but may also want to be able to return the item to the retailer. In this situation, the retailer, who has knowledge of first verification data stored on the tag, may generate second verification data based on, for example, information associated with the transaction. The retailer may then write the second verification data to the tag, optionally provide the second verification data to the customer (e.g., on a receipt), and publicize the tag to require receiving the second verification data (or the first verification data) before participating in future inventories. A rogue reader will not know the first or second verification data and will not be able to inventory the tag. In some embodiments, the retailer ensures that either the first or second verification data cannot be overwritten or changed, thereby allowing the retailer to access or privatize the tag even if the customer adds updated verification data to the tag. A returns desk at the retailer will know the first, second, and/or updated verification data, from the receipt, from information provided by the customer, and/or from information stored at the retailer, and will be able to use the first, second, and/or updated verification data to inventory the tag as described above, accept the return, and privatize the tag in preparation for a future sale.

In some embodiments, verification data may include a dynamic component. For example, the verification data stored on a tag may include or be based on one or more data values that change as a function of time, tag state, or events. In one embodiment, the tag may implement a counter that counts the number of successful or unsuccessful verification attempts made by one or more readers, and the verification data may include the counter value. In other embodiments, the tag may implement a counter that counts any other relevant event, and the verification data may include the counter value.

The techniques described herein may be applicable to situations other than the retail example above. For example, tagged items in a shipping container may be placed in a quiet public state in order to reduce the number of tags responding to an inventorying command. In this example, the shipping container may have a container or manifest tag. The container tag may list the tags in the container and may also either store or provide access (for example, via a network server or service) to group verification data for the tagged items in the container. The container tag may allow any reader or entity, or only authorized readers or entities, to access the group verification data. A reader capable of reading the container tag and retrieving the group verification data may then use the group verification data to inventory the tagged items in the container, as described above, to check that tagged items expected to be in the container are actually in the container.

As another example, individual components of a larger device or system may be tagged for tracking. Upon assembly into the device or system, the component tags may be placed into a quiet public state, again to reduce the number of tags responding to an inventorying command or to hide the tags from unauthorized readers or entities. The device or system may have an associated tag that allows an authorized reader or entity to retrieve group verification data, either from the tag or via a network, that in turn allows the reader or entity to inventory the individual component tags.

The states, flags, commands, choice of values (asserted versus deasserted) and configurations described above are for illustration purposes only and do not constitute a limitation on embodiments. Additional states, flags, commands, and configurations may be used to define tag behavior using the principles described herein.

Embodiments also include methods. Some are methods of operation of an RFID tag or an RFID tag chip. These methods can be implemented in any number of ways, including the structures described in this document. One such way is by machine operations, of devices of the type described in this document.

Another optional way of implementing these methods is for one or more of the individual operations of the methods to be performed in conjunction with one or more human operators performing some of them. These operators need not be collocated with each other, but each can be with a machine that performs a portion of a program or operation.

Figure 13:
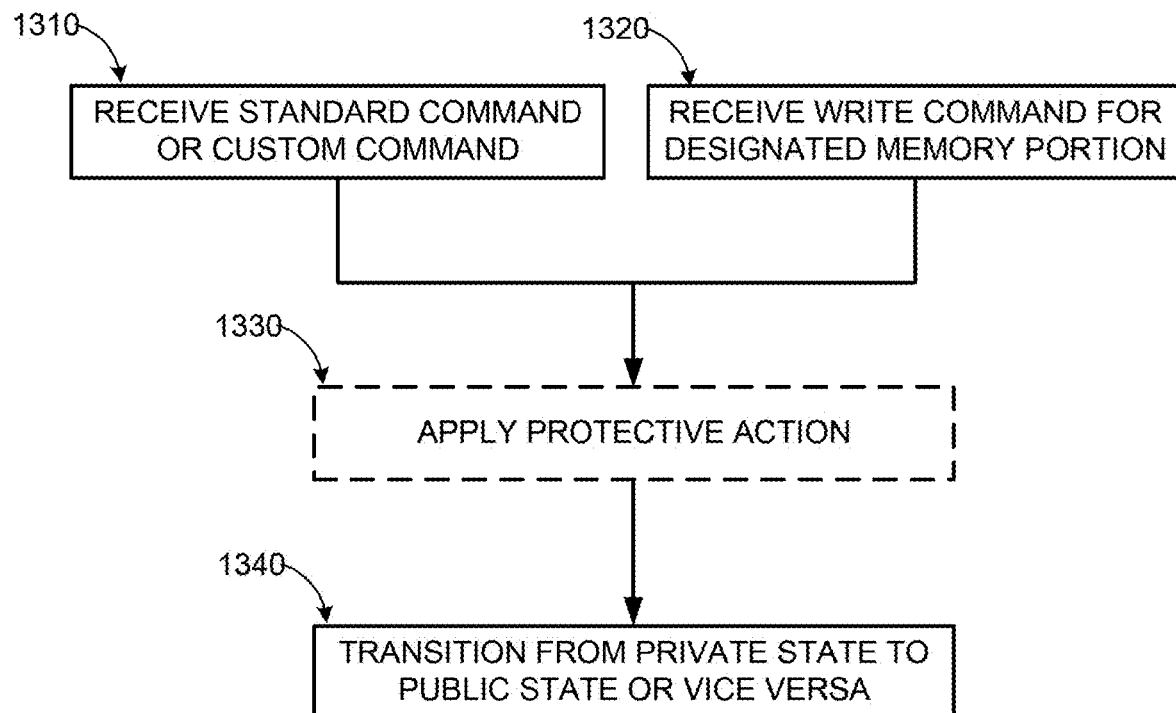
FIG. 13 is a flowchart for a process of an RFID tag transitioning from a private to a public state or vice versa according to embodiments.

FIG. 13 is a flowchart for a process of an RFID tag transitioning from a private to a public state, or vice versa, according to embodiments.

Process 1300 begins with one of alternative operations 1310 and 1320, where a tag receives either a standard or custom command, or a write command that writes directly to a portion of tag memory. A tag will typically have already been inventoried and uniquely identified by a reader prior to receiving one of these commands, but unique identification is not strictly necessary.

At optional operation 1330, the tag may employ a protective action to prevent rogue readers from improperly causing the tag to change state. For example, the tag may require receiving a password, security code, or other verification data. In some embodiments, the tag may change state only upon receiving a command from a verified reader. Other security measures may include only performing one of the aforementioned commands when the reader is in close proximity to the tag, or is in direct physical contact with the tag, or any of a variety of security measures as is well known to those skilled in the art.

At operation 1340, the tag executes the aforementioned command and transitions from a private state to a public state or from a public state to a private state.

Figure 14:
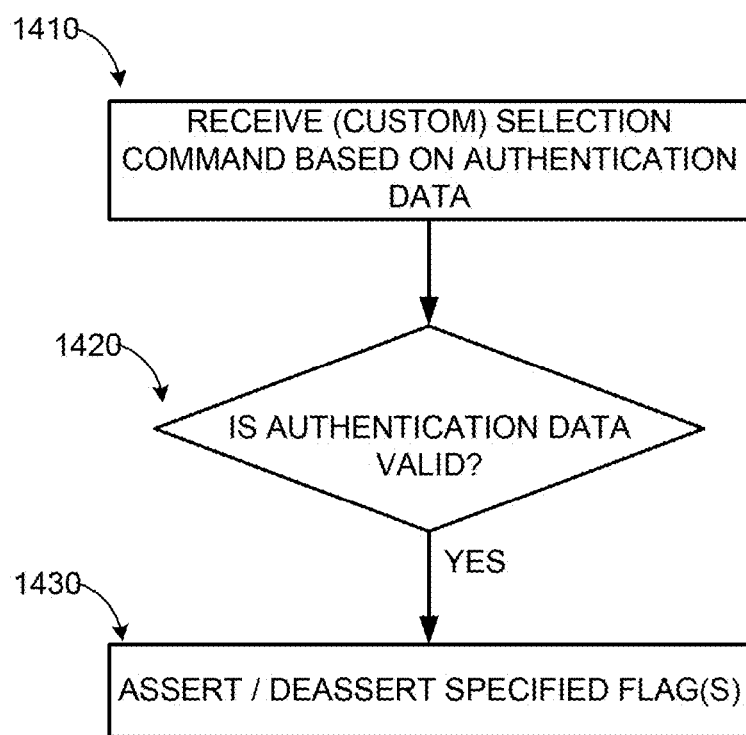
FIG. 14 is a flowchart for a process of an RFID tag asserting or deasserting its flag(s) according to embodiments.

FIG. 14 is a flowchart for a process of an RFID tag asserting or deasserting a flag or flag(s) in response to a selection (or custom) command after verifying that the command is based on valid verification data, according to embodiments. In some embodiments, the verification data may be stored in part or all of Reserved memory, EPC memory, TID memory, and/or user memory as in FIG. 8.

Process 1400 begins with operation 1410, where the tag receives a selection command, a custom selection command, or another custom command attempting to modify one or more of the tag's flags. As a security measure the command may be based on verification data known to the tag, such as a string, password, PIN, salt, or key. The tag then determines whether the command is correctly based on the verification data, for example by comparing the command to a stored memory content. If so, the tag then verifies that the reader "knows" the tag. The received command typically includes other information such as a memory-bank indicator, a memory-address pointer, a string length, an error-check code, and other such data, although these latter items are not strictly necessary.

At decision operation 1420, the tag makes a decision as to whether the received command is correctly based on known verification data, and if so, the tag may assert or deassert the specified flag(s) at operation 1430. In some embodiments, the tag may enforce state-dependent rules on verification data length as described above, for example allowing a 1-bit piece of verification data to verify a reader in the private state where the environment is often secure, and longer verification data to verify a reader when the tag is in the public state. If the verification data does not correspond to the verification data stored in tag memory then the tag will not modify the specified flag(s), and may even take further protective action such as increasing the verification data length required to verify the reader.

Figure 15:
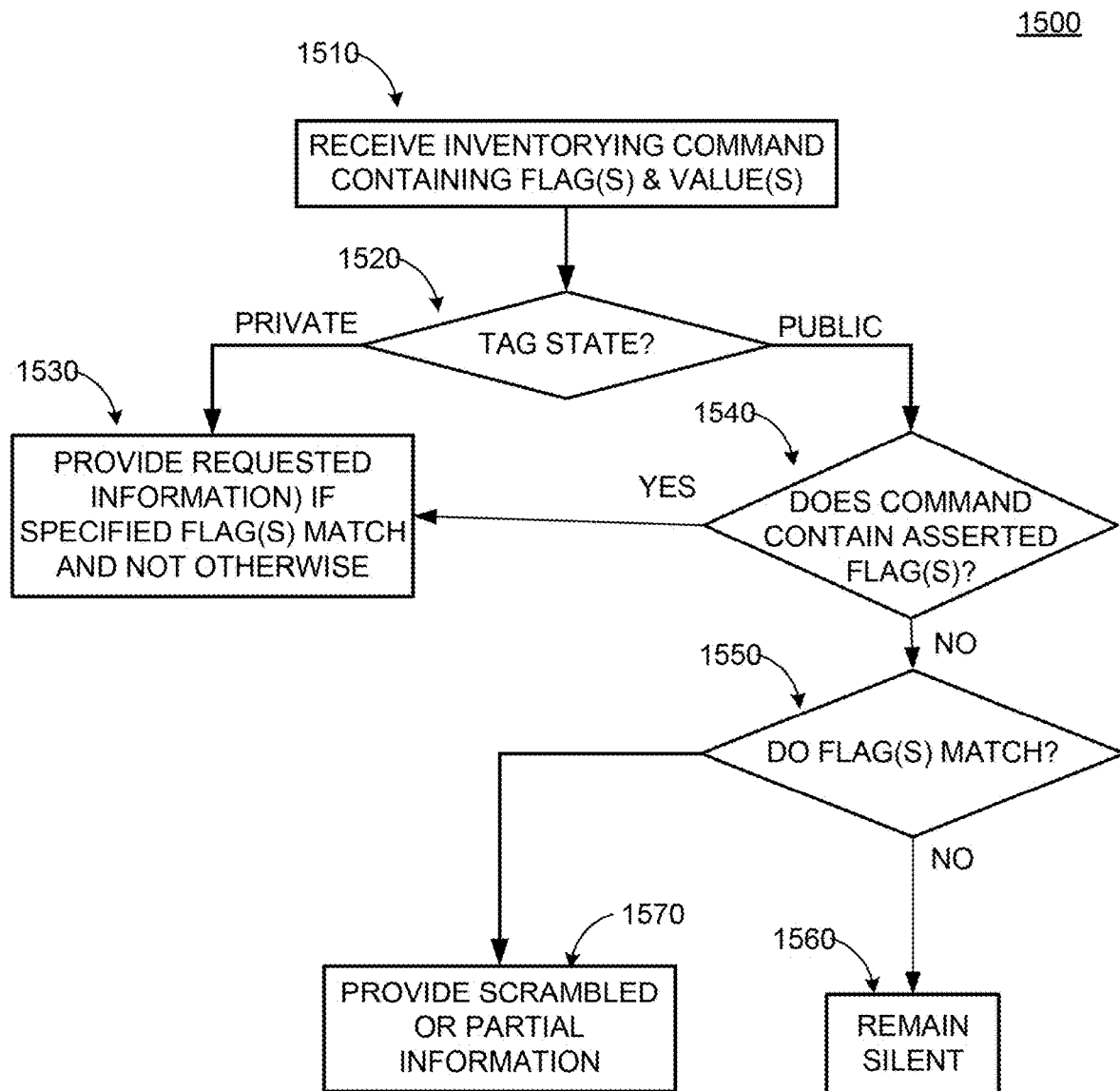
FIG. 15 is a flowchart for a process of an RFID tag behavior during an inventory round based on tag flag value(s) and tag state according to embodiments.

FIG. 15 is a flowchart for a process of an RFID tag behavior during an inventory round based on tag flag(s) and tag state according to embodiments.

Process 1500 begins with operation 1510, where the tag receives an inventorying command from a reader specifying one or more flags and their associated values. At decision operation 1520, the tag determines whether it is in a private or a public state.

If the tag is in a private state then it may participate in an inventory round at operation 1530 and provide the requested information, such as its actual identifier, to the reader. As described above, the tag decides whether to participate in the inventory round based on whether its flag value(s) match those specified in the inventorying command. If they match then the tag participates. If they do not match then the tag does not participate and remains silent.

If the tag is in a public state then the tag determines at decision operation 1540 whether the inventorying command contains asserted flag(s). If the inventorying command contains asserted flags then the tag transitions to operation 1530 and may participate in an inventory round and provide the requested information, such as its actual identifier, to the reader. As described above, the tag decides whether to participate based on whether its flag value(s) match those specified in the inventorying command. If they match then the tag participates. If they don't match then the tag does not participate and remains silent.

If, at decision operation 1540 the tag determines that the inventorying command does not contain asserted flag(s) then the tag transitions to decision operation 1550, where the tag determines if the flag(s) specified in the inventorying command command match those on the tag. In the event of a match, the tag transitions to operation 1570 and either remains silent, provides scrambled information, or provides partial information depending on the tag type and its public-state type, as described in conjunction with diagram 1200 of FIG. 12. In the event of a mismatch the tag transitions to operation 1560 and remains silent.

The operations described in processes 1300-1500 are for illustration purposes only. A tag according to embodiments may transition between private and public states in different manners or by different paths, assert or deassert flag(s) by different means, make different determinations as to how to respond as a function of state and flag matching/mismatching, and respond to queries from a reader in other ways employing additional or fewer operations and in different orders using the principles described herein.

According to one example, a method for an RFID integrated circuit (IC) configurable to operate in a private state and in a public state, and to transition at least from the private state to the public state, to determine whether to respond to an inventorying command to a reader, is provided. The method may include, when the IC is in the private state, receiving the inventorying command and responding to the inventorying command regardless of whether the reader is verified or unverified. The method may further include, when the IC is in the public state, receiving the inventorying command and responding to the inventorying command if the reader is verified, else not responding to the inventorying command.

According to some embodiments, the method further includes receiving a personal identification number (PIN) from the reader and determining that the reader is verified if the PIN is valid. The PIN may be a group PIN including a shared string and/or a group password, or an individual PIN including an IC password and/or an IC salt. The method may further include determining that the received PIN is valid if the received PIN matches a stored PIN and another PIN was not received prior to the received PIN without receiving an intervening inventorying command. If the reader is not verified, the method may further include invoking a timeout and/or revoking a verification of the reader. When the IC is in either the private or public states and the reader is verified, the method may include receiving the PIN from the reader and storing the PIN in a memory of the IC and/or receiving an updated PIN from the reader and storing the updated PIN in the memory. When the IC is in either the private or public states, the method may further include receiving a command from the reader to transition to the other of the private or public states, determining whether the reader is verified, and transitioning to the other of the private or public states if the reader is verified.

According to another example, a method for an RFID IC configurable to operate in a private state and in a public state, and to transition at least from the private state to the public state, to determine whether to provide an identifier to a reader, is provided. The method may include, when the IC is in the private state, receiving a request for the identifier from the reader and providing the identifier regardless of whether the reader is verified or unverified. The method may further include, when the IC is in the public state, receiving the request for the identifier from the reader and providing the identifier if the reader is verified, else not providing the identifier.

According to some embodiments, the method further includes receiving a personal identification number (PIN) from the reader and determining that the reader is verified if the PIN is valid. The PIN may be a group PIN including a shared string and/or a group password, or an individual PIN including an IC password and/or an IC salt. The method may further include determining that the received PIN is valid if the received PIN matches a stored PIN and another PIN was not received prior to the received PIN without receiving an intervening inventorying command. If the reader is not verified, the method may further include invoking a timeout and/or revoking a verification of the reader. When the IC is in either the private or public states and the reader is verified, the method may include receiving the PIN from the reader and storing the PIN in a memory of the IC and/or receiving an updated PIN from the reader and storing the updated PIN in the memory. When the IC is in either the private or public states, the method may further include receiving a command from the reader to transition to the other of the private or public states, determining whether the reader is verified, and transitioning to the other of the private or public states if the reader is verified.

According to a further example, an RFID IC configured to operate in a private state and in a public state, and to transition at least from the private state to the public state, is provided. The IC may include a transceiver configured to exchange radio frequency (RF) signals with a reader and a processor coupled to the transceiver. The processor may be configured to, when the IC is operating in the private state, receiving an inventorying command from the reader via the transceiver and respond to the inventorying command via the transceiver regardless of whether the reader is verified or unverified. The processor may be further configured to, when the IC is operating in the public state, receive the inventorying command from the reader via the transceiver, receive a code via the transceiver prior to receiving the inventorying command or included in the inventorying command, determined whether the received code is valid, and consider the reader verified and respond to the inventorying command if the received code is valid else not respond to the inventorying command.

According to some embodiments, the code may be a group PIN including a shared string and/or a group password, or an individual PIN including an IC password and/or an IC salt. The IC may further include a memory coupled to the processor, and the processor may be configured to determine that the received PIN is valid if the received code matches a stored code in the memory and another code was not received prior to the received code without receiving an intervening inventorying command. If the reader is not verified, the processor may be configured to invoke a timeout and/or revoke a verification of the reader. When the IC is in either the private or public states and the reader is verified, the processor may be further configured to receive the code from the reader and store the code in the memory or receive an updated code from the reader and store the updated code in the memory. When the IC is in the private or public state, the processor may be further configured to receive a command from the reader to transition to the other of the private or public states, determine whether the reader is verified, and transition to the other of the private or public states if the reader is verified.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented (such as by tags according to embodiments formed) individually and/or collectively, by a wide range of hardware, software, firmware, or virtually any combination thereof. Those skilled in the art will recognize that some aspects of the RFID tag embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, tags, readers, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A method for a Radio-Frequency Identification (RFID) integrated circuit (IC) to determine whether to respond to a received inventorying command, wherein the IC is configurable to operate in a public state and in a private state and to transition to the public state at least from the private state, the method comprising:
   when the IC is in the public state:
      receiving a selection command containing a personal identification number (PIN);
      receiving the inventorying command;
      determining whether the PIN is correct; and
      if the PIN is correct then responding to the inventorying command, else not responding to the inventorying command; and
   when the IC is in the private state:
      receiving the inventorying command; and
      responding to the inventorying command regardless of whether a correct PIN has been received.

2. The method of claim 1, further comprising determining that the PIN is correct by determining that the PIN has a sequence of consecutive bits that corresponds to data stored by the RFID IC.

3. The method of claim 1, wherein the PIN is one of:
   a group PIN including at least one of a shared string and a group password; and
   an individual IC PIN including at least one of a password and a salt.

4. The method of claim 1, further comprising, when the IC is in the public state, not responding to the inventorying command even if the PIN is correct if at least one of:
   an incorrect PIN was received immediately prior to the selection command; and
   the IC is in a timeout.

5. The method of claim 1, further comprising, when the IC is in either the private or public states and the PIN is correct:
   receiving an updated PIN; and
   storing the updated PIN in a memory of the IC.

6. The method of claim 1, further comprising, when the IC is in one of the private or public states:
   receiving a command to transition to the other of the private or public states;
   determining whether a correct PIN has been received; and
   if the correct PIN has been received, transitioning to the other of the private or public states.

7. A method for a Radio Frequency Identification (RFID) integrated circuit (IC) to determine whether to respond to a received inventorying command, wherein the IC has a security gate flag and is configured to operate in a public state and in a private state and to transition to the public state at least from the private state, the method comprising:
   when the IC is in the public state:
      receiving a selection command containing a personal identification number (PIN);
      determining whether the PIN is correct;
      if the PIN is correct then placing the security gate flag in an asserted state, else placing the security gate flag in an unasserted state;
      receiving the inventorying command;
      determining whether the inventorying command specifies the security gate flag in the asserted state and does not specify the security gate flag in the unasserted state; and
      if the inventorying command specifies the security gate flag in the asserted state then responding to the inventorying command, else not responding to the inventorying command; and
   when the IC is in the private state:
      receiving the inventorying command; and
      responding to the inventorying command regardless of whether the inventorying command specifies the security gate flag in the asserted state.

8. The method of claim 7, further comprising determining that the PIN is correct by determining that the PIN has a sequence of consecutive bits that corresponds to data stored by the RFID IC.

9. The method of claim 7, wherein the PIN is one of:
   a group PIN including at least one of a shared string and a group password; and
   an individual IC PIN including at least one of a password and a salt.

10. The method of claim 7, wherein the selection command instructs the IC to place the security gate flag in the asserted state.

11. The method of claim 7, further comprising, when the IC is in the public state, responding to the inventorying command if the inventorying command specifies the security gate flag in the asserted state and the selection command was received immediately prior to receiving the inventorying command.

12. The method of claim 7, further comprising, when the IC is in the public state, not responding to the inventorying command even if the inventorying command specifies the security gate flag in the asserted state if at least one of:
an incorrect PIN was received immediately prior to the selection command; and
the IC is in a timeout.

13. The method of claim 7, further comprising, when the IC is in either the private or public states and the PIN is correct:
receiving an updated PIN; and
storing the updated PIN in a memory of the IC.

14. The method of claim 7, further comprising, when the IC is in one of the private or public states:
receiving a command to transition to the other of the private or public states;
determining whether a correct PIN has been received; and
if the correct PIN has been received, transitioning to the other of the private or public states.

15. A method for a Radio-Frequency Identification (RFID) integrated circuit (IC) to determine whether to respond to a received inventorying command, wherein the IC is configurable to operate in a public state and in a private state and to transition to the public state at least from the private state, the method comprising:
when the IC is in the public state:
receiving the inventorying command;
determining whether the inventorying command contains a correct personal identification number (PIN); and
if the inventorying command includes a correct PIN then responding to the inventorying command, else not responding to the inventorying command; and when the IC is in the private state:
receiving the inventorying command; and
responding to the inventorying command regardless of whether the inventorying command includes a correct PIN.

16. The method of claim 15, further comprising determining that the inventorying command contains a correct PIN by determining that the inventorying command contains a sequence of consecutive bits that corresponds to data stored by the RFID IC.

17. The method of claim 16, wherein the PIN is one of:
a group PIN including at least one of a shared string and a group password; and
an individual IC PIN including at least one of a password and a salt.

18. The method of claim 15, further comprising, when the IC is in the public state, not responding to the inventorying command even if the inventorying command includes the correct PIN if at least one of:
the inventorying command does not specify a security gate flag of the IC in an asserted state;
an incorrect PIN was received immediately prior to the inventorying command; and
the IC is in a timeout.

19. The method of claim 15, further comprising, when the IC is in either the private or public states and a correct PIN has been received:
receiving an updated PIN; and
storing the updated PIN in a memory of the IC.

20. The method of claim 15, further comprising, when the IC is in one of the private or public states:
receiving a command to transition to the other of the private or public states;
determining whether a correct PIN has been received; and
if the correct PIN has been received, transitioning to the other of the private or public states.

\* \* \* \* \*

UNITED STATES PATENT AND TRADEMARK OFFICE
CERTIFICATE OF CORRECTION

PATENT NO. : 11,062,190 B1  
APPLICATION NO. : 16/556587  
DATED : July 13, 2021  
INVENTOR(S) : Christopher J. Diorio et al.

Page 1 of 1

It is certified that error appears in the above-identified patent and that said Letters Patent is hereby corrected as shown below:

In the Drawings

In Sheet 14 of 14 (Reference Numeral 1530) (FIG. 15), Line 2, Delete "INFORMATION)" and insert -- INFORMATION --, therefor.

In the Specification

In Column 11, Line 59, Delete ""knows"" and insert -- "knows" --, therefor.

In Column 16, Line 4, Delete "and or" and insert -- and/or --, therefor.

In Column 16, Line 31, Delete "51" and insert -- S1 --, therefor.

In Column 21, Line 66-67, Delete "command command" and insert -- command --, therefor.

In Column 24, Line 10, Delete "and or" and insert -- and/or --, therefor.

Signed and Sealed this  
Thirtieth Day of November, 2021

Drew Hirshfeld  
*Performing the Functions and Duties of the*  
*Under Secretary of Commerce for Intellectual Property and*  
*Director of the United States Patent and Trademark Office*